(12) United States Patent
Andreev et al.

(10) Patent No.: US 7,065,606 B2
(45) Date of Patent: Jun. 20, 2006

(54) CONTROLLER ARCHITECTURE FOR MEMORY MAPPING

(75) Inventors: Alexander E. Andreev, San Jose, CA (US); Igor A. Vikhliantsev, Sunnyvale, CA (US); Ranko Scepanovic, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 351 days.

(21) Appl. No.: 10/655,191

(22) Filed: Sep. 4, 2003

(65) Prior Publication Data

US 2005/0055527 A1  Mar. 10, 2005

(51) Int. Cl.
*G06F 12/00* (2006.01)
(52) U.S. Cl. .................. 711/102; 711/170; 711/202
(58) Field of Classification Search ............. None
See application file for complete search history.

(56) References Cited

U.S. PATENT DOCUMENTS 6,779,100 B1 * 8/2004 Keltcher et al. ............ 711/202
2004/0019756 A1 * 1/2004 Perego et al. ............... 711/170

\* cited by examiner

Primary Examiner—Kevin L. Ellis
Assistant Examiner—Duc T Doan
(74) Attorney, Agent, or Firm—Suiter West PC LLO

(57) ABSTRACT

The present invention is directed to a method and apparatus for mapping a customer memory onto a plurality of physical memories. The apparatus may include: (a) a plurality of physical memories onto which a customer memory may be mapped, each of physical memories having a data width of m blocks, the customer memory having a data width of k blocks, and k and m being integers; (b) an address controller, communicatively coupled to a plurality of physical memories, for receiving first address information of the customer memory, for outputting second address information to a plurality of physical memories, and for outputting index information; (c) a data input controller, communicatively coupled to the address controller and a plurality of physical memories, for receiving data of the customer memory and the index information, and for outputting data with a data width of m blocks to a plurality of physical memories; and (d) a data output controller, communicatively coupled to a plurality of physical memories and to the address controller though a delay unit, for receiving the index information, for receiving output, with a width of said m blocks, of a plurality of physical memories, and for outputting the customer memory with a width of said k blocks.

16 Claims, 8 Drawing Sheets

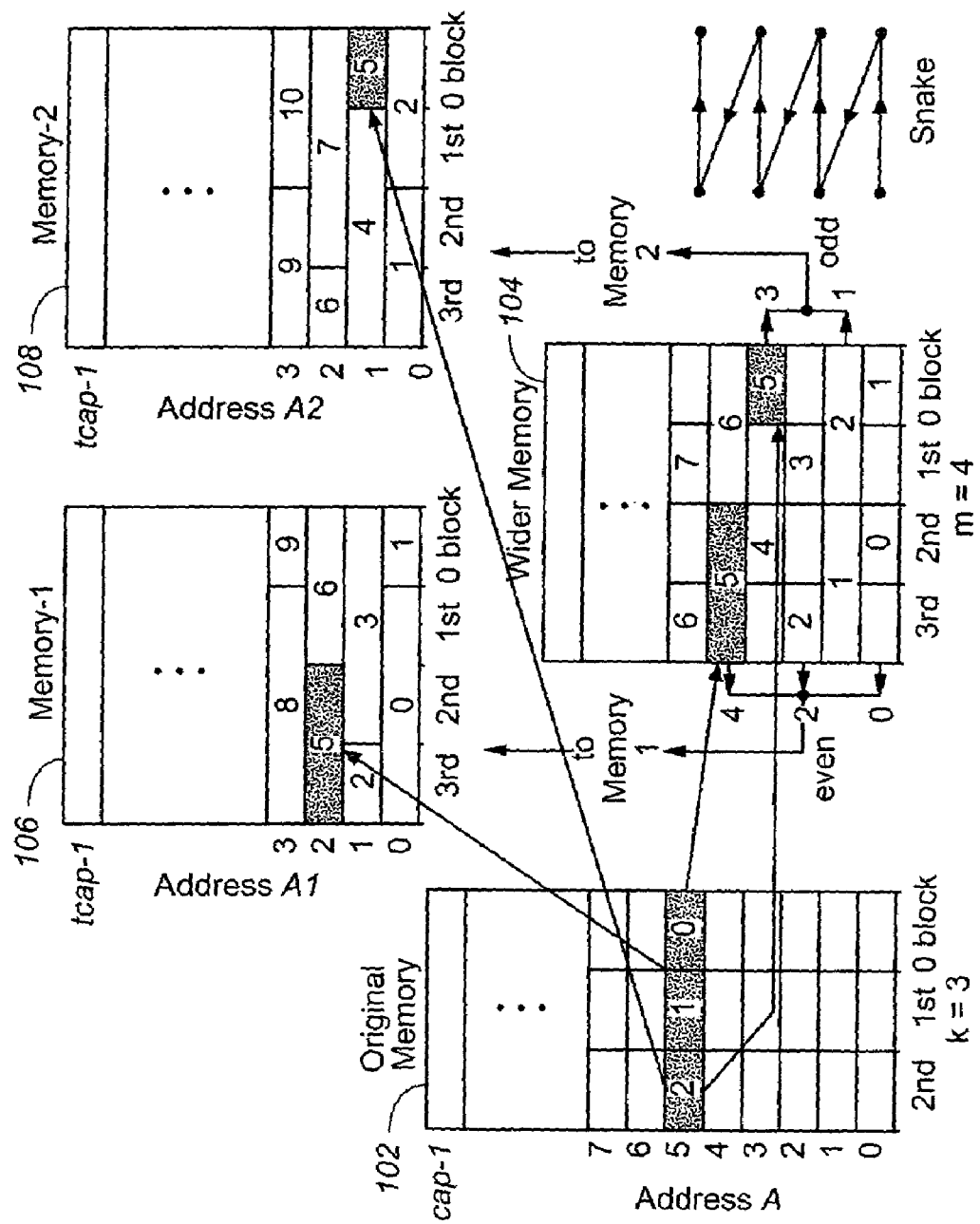
FIG._1

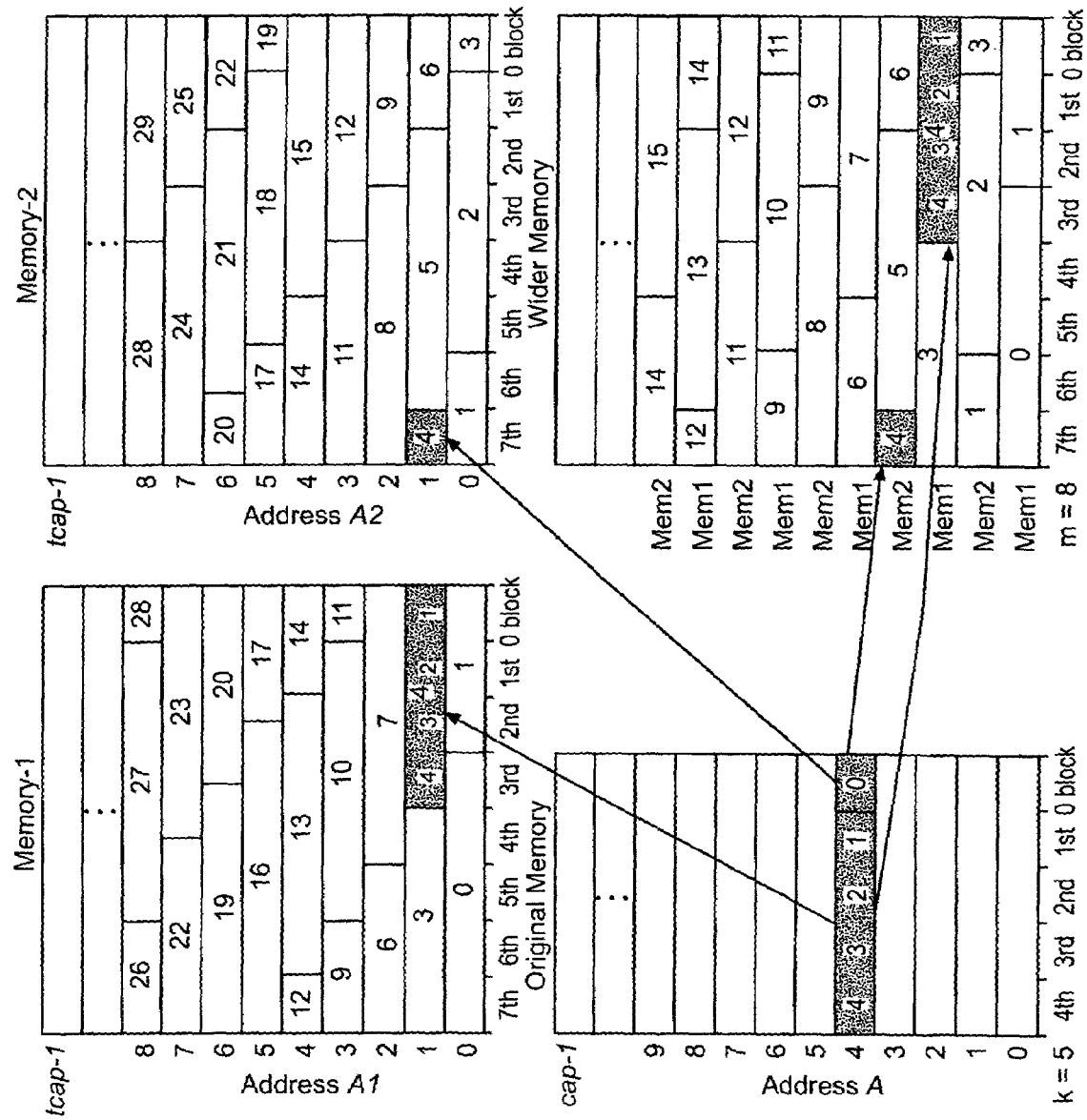
FIG._2

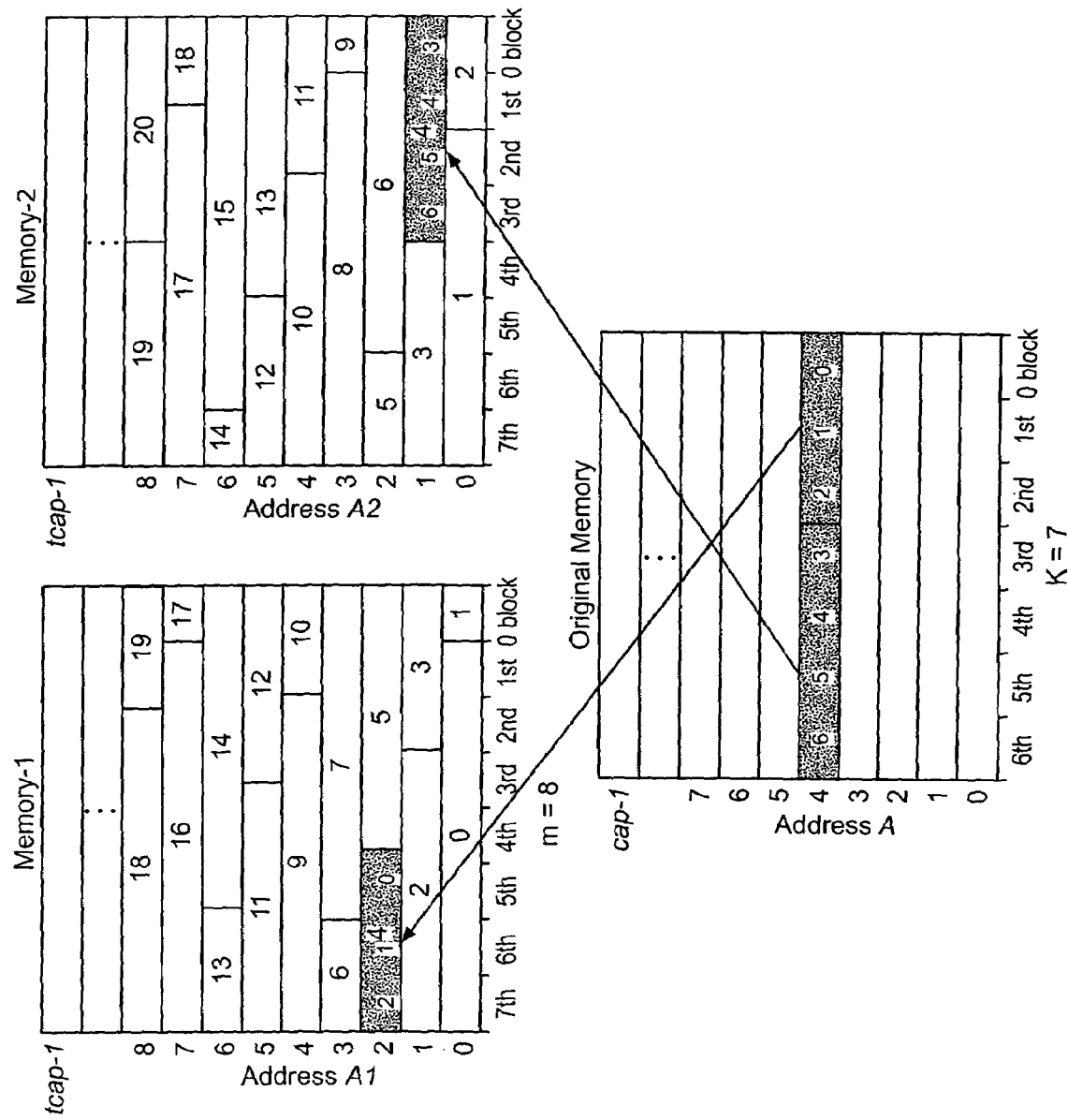
FIG._3

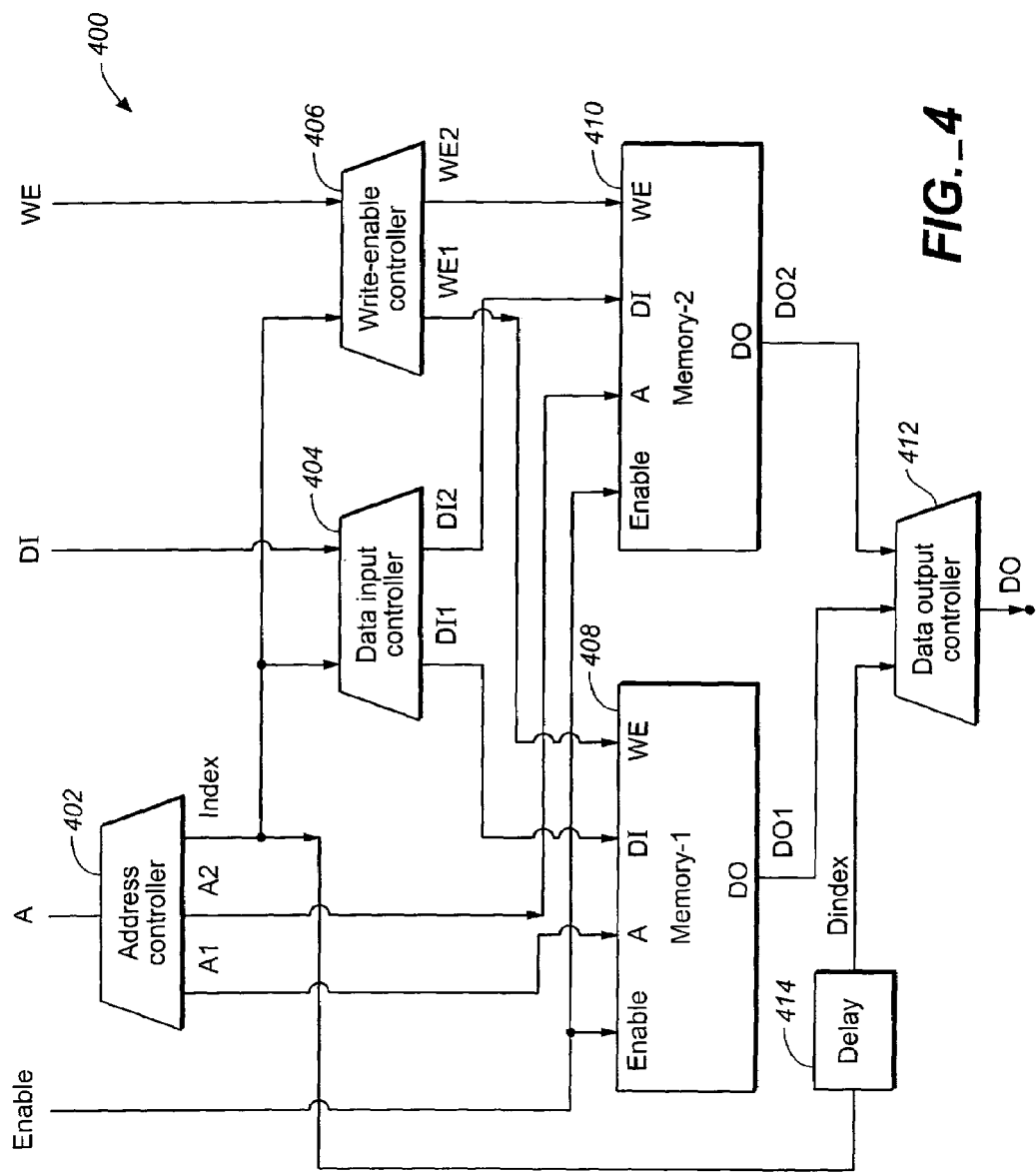
FIG._4

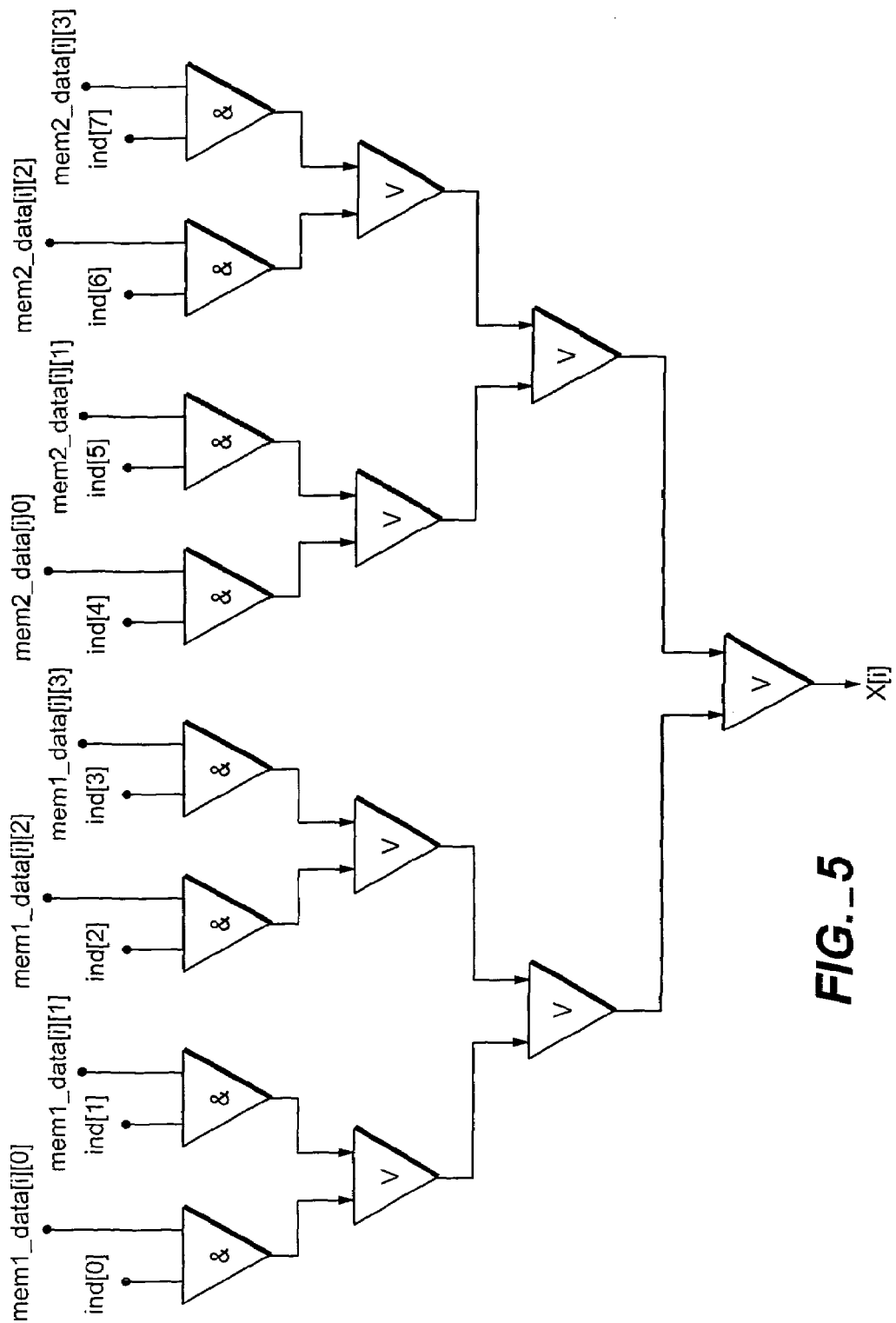
FIG._5

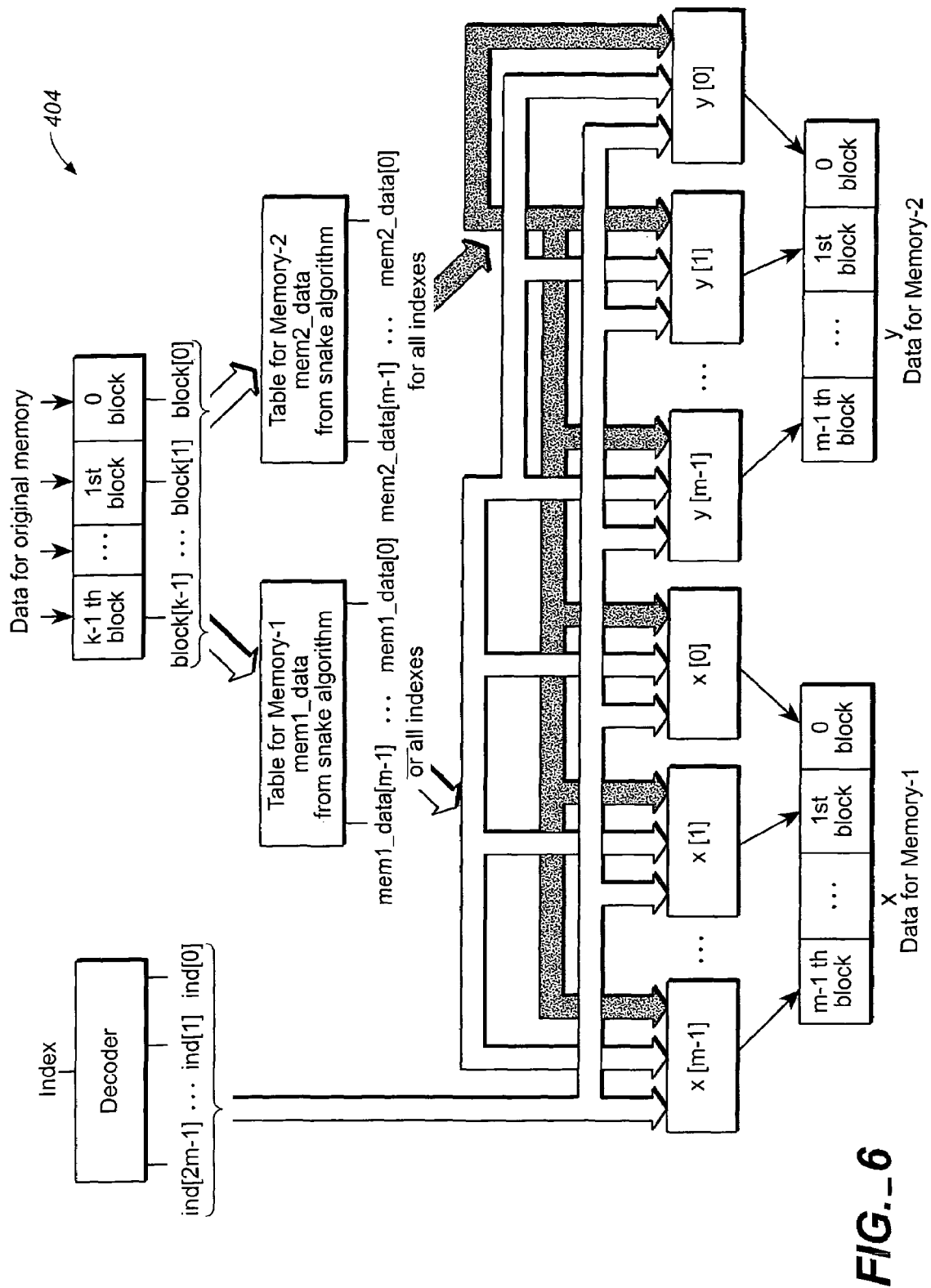
FIG._6

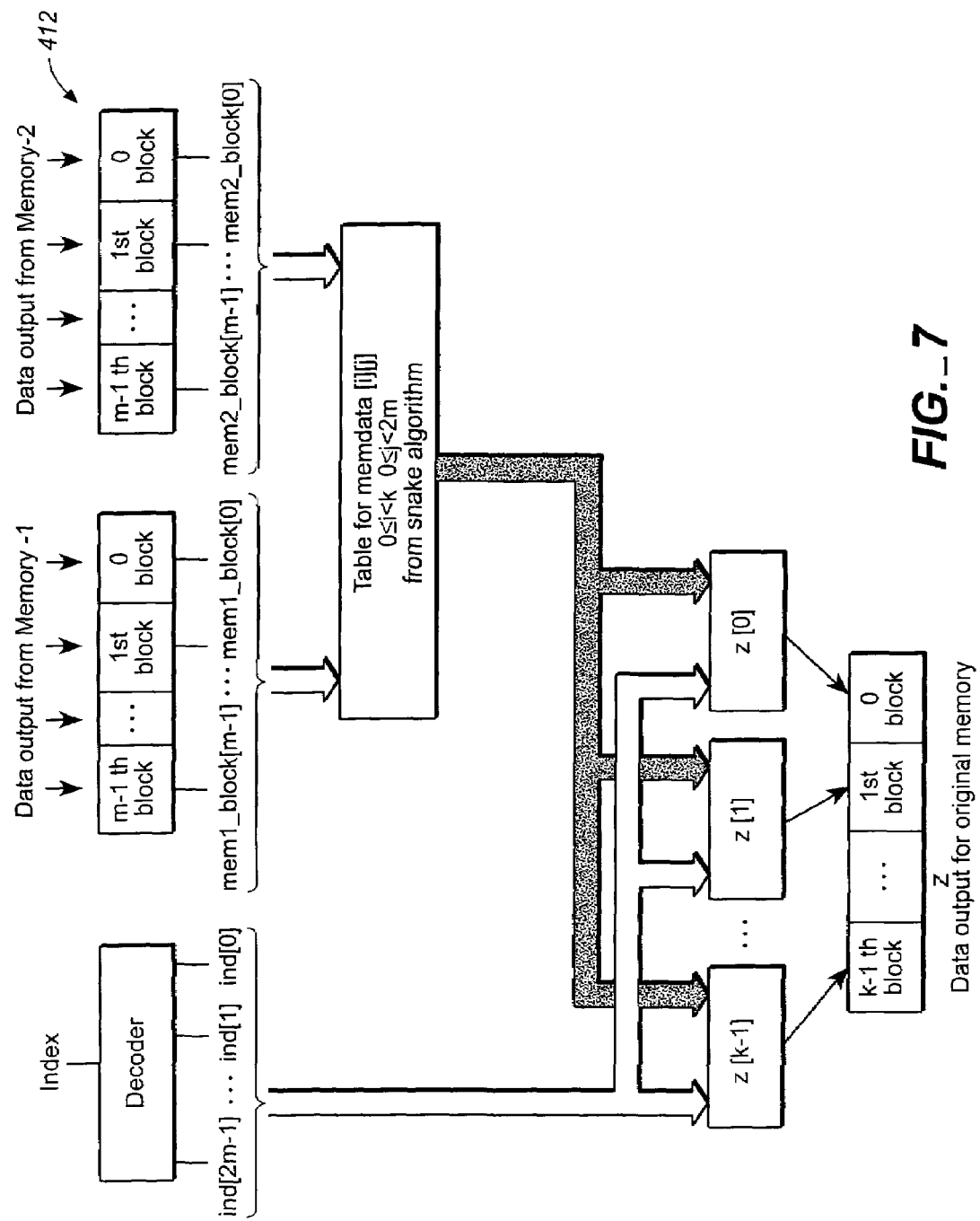
FIG._7

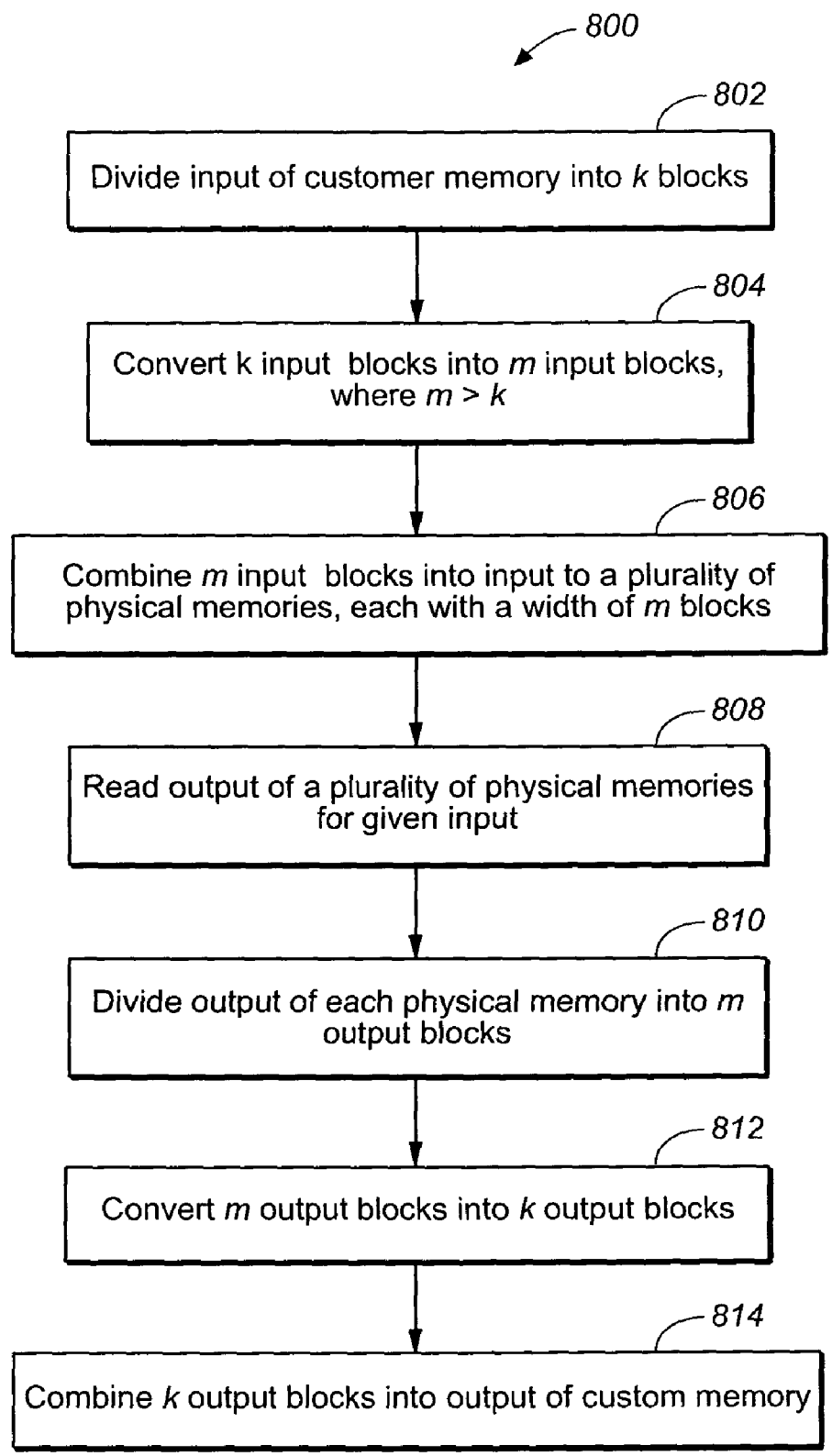
FIG._8

CONTROLLER ARCHITECTURE FOR MEMORY MAPPING

FIELD OF THE INVENTION

The present invention generally relates to integrated circuits, and particularly to an apparatus and method for synthesizing a controller that automatically maps a customer's logic memories to given physical memories.

BACKGROUND OF THE INVENTION

Integrated circuit (IC) design on a chip, e.g., LSI Logic Corporation's RapidSlice™, and the like, usually contains physical memories with fixed capacities and fixed data widths. However, a customer's IC design may contain logic memories with different capacities and data widths. Conventionally, mapping customer's logic memories to given physical memories is done manually, which is a very tedious and time-consuming process. Therefore, it would be advantageous to provide a controller for automatically mapping a customer's arbitrary logic memory into physical memories on a chip.

SUMMARY OF THE INVENTION

Accordingly, the present invention is directed to an apparatus and method for synthesizing a controller that automatically maps customer's logic memories to given physical memories. In an exemplary aspect of the present invention, a method for mapping a customer memory onto a plurality of physical memories may include the following steps: (a) dividing input of a customer memory into k input blocks, where k is an integer; (b) converting k input blocks into m input blocks, where m is an integer; and (c) combining m input blocks into input to a plurality of physical memories, each physical memory having a data width of m blocks.

In an additional exemplary aspect of the present invention, an apparatus for mapping a customer memory onto a plurality of physical memories may include: (a) a plurality of physical memories onto which a customer memory may be mapped, each of physical memories having a data width of m blocks, the customer memory having a data width of k blocks, and k and m being integers; (b) an address controller, communicatively coupled to a plurality of physical memories, for receiving first address information of the customer memory, for outputting second address information to a plurality of physical memories, and for outputting index information; (c) a data input controller, communicatively coupled to the address controller and a plurality of physical memories, for receiving data of the customer memory and the index information, and for outputting data with a data width of m blocks to a plurality of physical memories; and (d) a data output controller, communicatively coupled to a plurality of physical memories and to the address controller though a delay unit, for receiving the index information, for receiving output, with a width of said m blocks, of a plurality of physical memories, and for outputting the customer memory with a width of said k blocks.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 shows an exemplary snake algorithm for k=3 and m=4 in accordance with an exemplary embodiment of the present invention;

FIG. 2 shows an exemplary snake algorithm for k=5 and m=8 in accordance with an exemplary embodiment of the present invention;

FIG. 3 shows exemplary snake packing for k=7 and m=8 in accordance with an exemplary embodiment of the present invention;

FIG. 4 shows an exemplary circuit for realizing a snake algorithm in accordance with an exemplary embodiment of the present invention;

FIG. 5 shows an exemplary circuit for realizing x[i] for k=3 and m=4 in accordance with an exemplary embodiment of the present invention;

FIG. 6 shows an exemplary embodiment of the data input controller shown in FIG. 4 in accordance with an exemplary embodiment of the present invention;

FIG. 7 shows an exemplary embodiment of the data output controller shown in FIG. 4 in accordance with an exemplary embodiment of the present invention; and FIG. 8 is a flow chart of an exemplary method for mapping a logic memory onto a plurality of physical memories with different data width in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are shown. One purpose of the present invention may be to synthesize a controller that automatically maps customer's logic memories into given physical memories. In one embodiment, an algorithm (and corresponding architecture) is constructed to map a given logic memory into a plurality of physical memories with a larger number of bits.

I. "Snake" Algorithm for Memory Packing

Suppose there is a customer's logic memory with a capacity cap and data width w, and two physical memories, each with a capacity tcap and data width tw, where $$w < tw < 2*w, \quad (1)$$

also suppose $$w = k*\text{block\_width}, \quad (2\text{-}1)$$

and $$tw = m*\text{block\_width}, \quad (2\text{-}2)$$

i.e., customer's logic memory data and physical memory data may be divided into blocks of the width block_width, where k and m are both integers, then the following may be assumed:

$$m = 2^t \quad (3)$$

for some t.

From (1), the following may be obtained:

$$k < m < 2*k \quad (4)$$

According to (4), if m=4, then k=3; if m=8, then k=5 or k=7.

For k=6, block_width may be increased to twice wide, and m and k may be decreased to half according to formulas (2-1) and (2-2). Thus, for the case k=6, m=4 and k=3 may still be obtained.

The algorithm of the present invention goes through data blocks (cells) of an original logic memory like a snake and packs the data to a wider memory consecutively. After all the data of the original logic memory are packed into the wider memory, the wider memory may be divided into two physical memories in the following way: all the cells with even addresses of the wider memory may be consecutively put into the first memory named Memory-1, and all the cells with odd addresses of the wider memory may be consecutively put into the second memory named Memory-2.

FIG. 1 shows an exemplary snake algorithm for k=3 and m=4 in accordance with an exemplary embodiment of the present invention. As shown, an original logic memory 102 is 3 block_width wide (k=3), and a wider memory 104 is 4 block_width wide (m=4). The snake algorithm of the present invention packs blocks of data from the memory 102 into data blocks of the memory 104 as follows. For address A=0, the 2nd (uppermost), the 1st, and the zero (0, lowest) blocks of data from the memory 102 are packed into the 3rd (uppermost), the 2nd, and the 1st blocks of the memory 104 with address=0, respectively. For address A=1, the 2nd (uppermost), the 1st, and the zero (0, lowest) blocks of data from the memory 102 are packed into the zero (0) block of the memory 104 with address=0, the 3rd block of the memory 104 with address=1, and the 2nd block of the memory 104 with address=1, respectively. Thus, the algorithm of the present invention goes through blocks from the original logic memory 102 like a snake and packs the data to the wider memory 104 consecutively.

As shown in FIG. 1, after all the blocks of data from the original logic memory 102 are packed into the wider memory 104, the wider memory may be divided into two physical memories in the following way: all the cells with even addresses from the wider memory 104 may be consecutively put into a first memory 106 named Memory-1, and all the cells with odd addresses from the wider memory 104 may be consecutively put into a second memory 108 named Memory-2. For example, for address A=5, the uppermost (2nd) block of data from the original memory 102 may be put into the lowest (zero) block of the memory 108 with address A2=1, and the 1st and zero (0) blocks of data from the original memory 102 may be put into the 3rd (uppermost) and 2nd blocks of the memory 106 with address A1=2, respectively.

Similarly, for k=5 and m=8, an exemplary snake algorithm in accordance with an exemplary embodiment of the present invention is shown in FIG. 2, and for k=7 and m=8, exemplary snake packing in accordance with an exemplary embodiment of the present invention is shown in FIG. 3.

Obviously, $$A1=(A+1)*k/(2*m), \quad (5-1)$$

and $$A2=A*k/(2*m), \quad (5-2)$$

where A, A1, and A2 are all integers.

Take into account formula (3), the following may be obtained:

$$A1=((A+1)*k)>>(t+1), \quad (5a-1)$$

and $$A2=(A*k)>>(t+1) \quad (5a-2)$$

where the symbol ">>" represents a Bitwise Right-Shift. Operation a>>b means a right shift of all digits of integer a by b times, and returns the value of a divided by 2 to the power of b, i.e., $(a/2^b)$. For example, suppose a=25=(00011001) and b=3, then a>>b=3=(00000011). If a=($a_0$, $a_1$, . . . , $a_k$), then a>>b=(0, . . . , 0, $a_0$, $a_1$, . . . , $a_{(k-b)}$).

II. Circuit for Snake Algorithm Realization

The process of packing is periodic with a period (2*m) because k is odd. For a cell of the original logic memory with address A=(i+2m), the packing actions may be repeated as for the cell with address A=i. For a cell with address A=(i+m), the packing actions may be repeated as for the cell with address A=i, with one change (the memories are permuted because k is odd).

For example, in FIG. 1, for address A=5=1+m the same packing actions may be performed as for A=1 (but memories are permuted), and for address A=9=1+2*m the same packing actions may be performed as for A=1 (without memory permutation).

The index of the address in the period may be denoted by index. Obviously, $$index=A(\bmod(2*m)) \quad (6)$$

and from formula (3) the following may be obtained:

$$index=A>>(t+1) \quad (6a)$$

Thus, when A<2*m, index=A.

(1) Circuit

FIG. 4 shows an exemplary circuit 400 for realizing a snake algorithm in accordance with an exemplary embodiment of the present invention. As shown, the circuit may include an address controller 402, a data input controller 404, a write-enable controller 406, a physical Memory-1 408, a physical Memory-2 410, a data output controller 412, and a delay unit 414 such as a flip-flop, or the like.

The address controller 402 may receive an address A of an original logic memory as input. The address controller 402 may then output an address A1 of the physical Memory-1 408 based on formula (5a-1), an address A2 of the physical Memory-2 410 based on formula (5a-2), and an index based on formula (6a).

The data input controller 404 may receive DI (Data In) and the index as input. The DI may be a customer's arbitrary memory with a width of k block_width. The data input controller 404 may output DI1 and DI2, both with a width of m block_width. Thus, the data input controller 404 converts the customer's memory with a width of k block_width into memories with a width of m block_width. The data input controller 404 will be described in detail below.

The physical Memory-1 408 and the physical Memory-2 410 may receive DI1 and DI2 as input and output DO1 and DO2, respectively. Both DO1 and DO2 have a width of m block_width.

The data output controller 412 may receive a delayed index (Dindex obtained through the delay unit 414), DO1 and DO2 as input and may output DO, which has a width of k block_width. Thus, the data output controller 412 converts memories with a width of m block_width back into a memory with a width of k block_width. The data output controller 412 will be described in detail below.

The write-enable controller 406 is the same as the data input controller 404 except wires WE, WE1 and WE2 are used instead of DI, DI1 and DI2, respectively.

Thus, the circuit 400 automatically maps a customer's logic memory with a data width of k block_width to a plurality of physical memories, each with a data width of m block_width. From the customer's perspective, however, the customer may only see DI and DO, both have a data width of k block_width. The customer may not realize that the logic memory has been mapped to physical memories with a different data width.

(2) Data Input Controller

FIG. 6 shows an exemplary embodiment of the data input controller 404 shown in FIG. 4 in accordance with an exemplary embodiment of the present invention.

The i-th block of the input data (i.e., DI in FIG. 4) to the data input controller 404 may be denoted by block[i], where $0 \leq i < k$. Thus, block[k−1] represents the uppermost block of the input, and block[0] represents the lowest block of the input.

The content of i-th block of the Memory-1 for index=j may be denoted by mem1_data[i][j], and the content of i-th block of the Memory-2 for index=j may be denoted by mem2_data[i][j], where $0 \leq j < 2*m$ and $0 \leq i < m$.

For the semi-period m, the following may be obtained:

$$mem1\_data[i][j+m]=mem2\_data[i][j]$$

and $$mem2\_data[i][j+m]=mem1\_data[i][j]$$

When $0 \leq j < m$, because the snake subsequence is periodic the memories may be permuted.

For the full period 2*m, the following may be obtained $$mem1\_data[i][j+2*m]=mem1\_data[i][j]$$

and $$mem2\_data[i][j+2*m]=mem2\_data[i][j].$$

For example, for m=4 and k=3, the following may be obtained:

mem1_data[0][0]=0, mem1_data[1][0]=block[0], mem1_data[2][0]=block[1], mem1_data[3][0]=block[2], and mem2_data[i][0]=0 for any i, because all blocks with the address 0 belongs to Memory-1 (see, e.g., FIG. 1).

In addition, for m=4 and k=3, the following may be obtained:

mem1_data[0][2]=0, mem1_data[1][2]=0, mem1_data[2][2]=0, mem1_data[3][2]=block[0]

mem2_data[0][2]=block[1], mem2_data[1][2]=block[2], mem2_data[2][2]=0, and mem2_data[3][2]=0.

As shown in FIG. 6, the output of the decoder for index may be denoted by ind[2*m−1], . . . , ind[0]. The decoder realizes the system of all the conjunctions with (t+1) variables where t is the same as in the formula (3). For example, for index=4, ind[4]=1 and ind[i]=0 for other i.

The content of i-th input block for Memory-1 may be denoted by x[i], and the content of i-th input block for Memory-2 may be denoted by y[i], where $0 \leq i < m$. Thus, $$x[i]=((mem1\_data[i][0]~\&~ind[0])\vee(mem1\_data[i][1]\\\&~ind[1]\vee\ldots\vee(mem1\_data[i][m-1]~\&\\ind[m-1]))\vee((mem2\_data[i][0]~\&~ind[m])\\\vee(mem2\_data[i][1]~\&~ind[m+1])\ldots\\\vee(mem2\_data[i][m-1]~\&~ind[2m-1])),$$

and $$y[i]=((mem2\_data[i][0]~\&~ind[0])\vee(mem2\_data[i][1]\\\&~ind~[1])\vee\ldots\vee(mem2\_data[i][m-1]~\&\\ind[m-1]))\vee((mem1\_data[i][0]~\&~ind[m])\\\vee(mem1\_data[i][1]~\&~ind[m+1])\ldots\\\vee(mem1\_data[i][m-1]~\&~ind[2m-1])),$$

where "&" represents a logical conjunction, and "∨" represents a logic disjunction.

Note, based on the above two formulas, a tree of disjunctions with a minimal depth to realize x[i] and y[i] may be constructed. For example, FIG. 5 shows an exemplary circuit for realizing x[i] for k=3 and m=4 in accordance with an exemplary embodiment of the present invention. Note in FIG. 5, every bus has a width of block_width.

Referring back to FIG. 6, the output x is the result of the concatenation of x[m−1], x[k−2], . . . , x[1], x[0], and the output y is the result of the concatenation of y[m−1], y[k−2], . . . , y[1], y[0]. It is noted that the output x and y in FIG. 6 are equivalent to the output DI1 and DI2 of the data input controller 404 in FIG. 4, respectively.

(3) Data Output Controller

FIG. 7 shows an exemplary embodiment of the data output controller 412 shown in FIG. 4 in accordance with an exemplary embodiment of the present invention.

As described previously, the i-th block of the original input data (i.e., DI in FIG. 4) is denoted by block[i], where $0 \leq i < k$. The content of the i-th block of the original memory for index=j may be denoted by memdata[i][j], where $0 \leq j < 2*m$ and $0 \leq i < k$. For example, in FIG. 1, for m=4 and k=3, the following may be obtained:

memdata[0][1]=mem2_block[2], memdata[1][1]=mem2_block[3], memdata[2][1]=mem1_block[0], where mem1_block[i] represents the i-th block from the Memory-1 106 and mem2_block[i] represents the i-th block from the Memory-2 108.

Referring to FIG. 7, the output of the decoder for index may be denoted by ind[2*m−1], . . . , ind[0], as previously described. The content of the i-th output block from the data output controller 412 may be denoted by z[i], where $0 \leq i < k$. Thus, $$z[i]=(memdata[i][0]~\&~ind[0])\vee(memdata[i][1]~\&\\ind[1])\vee\ldots\vee(memdata[i][2m-1]~\&~ind[2m-\\1]).$$

Note, based on this formula, a tree of disjunctions with a minimal depth to realize z[i] may be constructed, similar to that shown in FIG. 5.

The output z in FIG. 7 is the result of the concatenation of z[k−1], z[k−2], . . . , z[1], z[0].

FIG. 8 is a flow chart of an exemplary process 800 for mapping a logic memory onto a plurality of physical memories with different data width in accordance with an exemplary embodiment of the present invention. The process may start with step 802 in which input of a customer's (logic) memory is divided into k blocks. The k input blocks may then be converted into m input blocks 804. The m input blocks may be combined into input to a plurality of physical memories, each physical memory having a data width of m blocks 806. Preferably, a plurality of physical memories are two physical memories. Output of a plurality of physical memories may be read for given input 808. Output of each physical memory may be divided into m output blocks 810. The m output blocks may be converted into k output blocks 812. The k output blocks may then be combined into output of the customer's memory 814.

The process 800 shown in FIG. 8 may be implemented in the circuit 400 shown in FIG. 4. Specifically, the steps 802, 804, and 806 may be implemented by the data input controller 404, and the steps 810, 812, and 814 may be implemented by the data output controller 412. It is understood that the process 800 shown in FIG. 8 may be implemented in other circuits as may be contemplated by a person of ordinary skill in the art without departing from the scope and spirit of the present invention.

It is to be noted that the above described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form hereinbefore described being merely an explanatory embodiment thereof, it is the intention of the following claims to encompass and include such changes.

What is claimed is:

1. A method for mapping a customer memory onto a plurality of physical memories, comprising:
dividing a data width of input of a customer memory into k input blocks, where said k is an integer;
converting said k input blocks into m input blocks, where said m is an integer; and
combining said m input blocks into input to a plurality of physical memories, each of said plurality of physical memories having a data width of m blocks,
wherein said m is greater than said k but less than twice said k.

2. The method of claim 1, further comprising:
reading output of said plurality of physical memories for given input;
dividing output of said each of said plurality of physical memories into m output blocks;
converting said m output blocks into k output blocks; and
combining said k output blocks into output of said customer memory.

3. The method of claim 2, wherein said plurality of physical memories are two physical memories.

4. An apparatus for mapping a customer memory onto a plurality of physical memories, comprising:
means for dividing a data width of input of a customer memory into k input blocks, where said k is an integer;
means for converting said k input blocks into m input blocks, where said m is an integer; and
means for combining said m input blocks into input to a plurality of physical memories, each of said plurality of physical memories having a data width of m blocks,
wherein said m is greater than said k but less than twice said k.

5. The apparatus of claim 4, further comprising:
means for reading output of said plurality of physical memories for given input;
means for dividing output of said each of said plurality of physical memories into m output blocks;
means for converting said m output blocks into k output blocks; and
means for combining said k output blocks into output of said customer memory.

6. The apparatus of claim 5, wherein said plurality of physical memories are two physical memories.

7. A computer-readable medium having computer-executable instructions for performing a method for mapping a customer memory onto a plurality of physical memories, said method comprising:
dividing a data width of input of a customer memory into k input blocks, where said k is an integer;
converting said k input blocks into m input blocks, where said m is an integer; and
combining said m input blocks into input to a plurality of physical memories, each of said plurality of physical memories having a data width of m blocks,
wherein said m is greater than said k but less than twice said k.

8. The computer-readable medium of claim 7, wherein said method further comprising:
reading output of said plurality of physical memories for given input;
dividing output of said each of said plurality of physical memories into m output blocks;
converting said m output blocks into k output blocks; and
combining said k output blocks into output of said customer memory.

9. The computer-readable medium of claim 8, wherein said plurality of physical memories are two physical memories.

10. An apparatus for mapping a customer memory onto physical memories, comprising:
- a first physical memory and a second physical memory onto which a customer memory may be mapped, said first physical memory and said second physical memory each having a data width of m blocks, said customer memory having a data width of k blocks, and said k and said m being integers;
- an address controller, communicatively coupled to said first physical memory and said second physical memory, for receiving first address information A of said customer memory, for outputting second address information A1 to said first physical memory, for outputting third address information A2 to said second physical memory, and for outputting index information index;
- a data input controller, communicatively coupled to said address controller, said first physical memory and said second physical memory, for receiving data DI of said customer memory, and said index information index, and for outputting data DI1 to said first physical memory and DI2 to said second physical memory, said DI1 and said DI2 having a data width of m blocks; and
- a data output controller, communicatively coupled to said first physical memory, said second physical memory, and said address controller though a delay unit, for receiving said index information index, for receiving output, with a width of said m blocks, of said first physical memory and said second physical memory, and for outputting said customer memory with a width of said k blocks,
- wherein said m is greater than said k but less than twice said k.

11. The apparatus of claim 10, further comprising a write-enable controller for enabling writing said output data of said data input controller to said first physical memory and said second physical memory.

12. The apparatus of claim 11, wherein said write-enable controller is same as said data input controller except wires WE (write enable), WE1 (write enable 1) and WE2 (write enable 2) are used instead of said DI, said DI1 and said DI2, respectively.

13. The apparatus of claim 10, wherein $A1=((A+1)*k)>>(t+1)$, $A2=(A*k)>>(t+1)$, $index=A>>(t+1)$, and $m=2^t$, said $>>$ representing a Bitwise Right-Shift.

14. The apparatus of claim 10, wherein said delay unit is a flip-flop.

15. An apparatus for mapping a customer memory onto a plurality of physical memories, comprising:
- a plurality of physical memories onto which a customer memory may be mapped, each of said plurality of physical memories having a data width of m blocks, said customer memory having a data width of k blocks, and said k and said m being integers;
- an address controller, communicatively coupled to said plurality of physical memories, for receiving first address information of said customer memory, for outputting second address information to said plurality of physical memories, and for outputting index information;
- a data input controller, communicatively coupled to said address controller and said plurality of physical memories, for receiving data of said customer memory and said index information, and for outputting data with a data width of m blocks to said plurality of physical memories; and a data output controller, communicatively coupled to said plurality of physical memories and said address controller though a delay unit, for receiving said index information, for receiving output, with a width of said m blocks, of said plurality of physical memories, and for outputting said customer memory with a width of said k blocks,
- wherein said m is greater than said k but less than twice said k.

16. The apparatus of claim 15, wherein said delay unit is a flip-flop.

* * * * *